United States Patent [19]

Boudry et al.

[11] Patent Number: 5,409,986
[45] Date of Patent: Apr. 25, 1995

[54] COVERINGS BASED ON THERMOPLSTIC ELASTOMERS, ESPECIALLY FLOOR COVERINGS

[75] Inventors: Jean-Michel Boudry, Bourg St. Andeol; Gilles Finaz, Lyon; Bernard J. Gagnaire, Saint-Paul-Trois-Chateaux; Cu-Cong Trinh, Caluire, all of France

[73] Assignee: Gerflor SA, Villeurbanne, France

[21] Appl. No.: 75,908

[22] Filed: Jun. 14, 1993

Related U.S. Application Data

[63] Continuation of Ser. No. 760,326, Sep. 16, 1991, abandoned.

[30] Foreign Application Priority Data

Sep. 19, 1990 [FR] France .................................. 90 11775

[51] Int. Cl.$^6$ .................. C08L 25/06; C08L 53/02; C08K 3/00; B29D 7/01
[52] U.S. Cl. .................. 524/505; 524/492; 524/504; 524/437; 524/441; 524/447; 525/914; 525/89; 525/98; 428/49; 428/327; 428/337; 428/338; 428/339
[58] Field of Search .............. 524/505, 509, 492, 437, 524/441, 447; 525/92, 914; 428/49, 327, 337, 338, 339

[56] References Cited

U.S. PATENT DOCUMENTS

| | | | |
|---|---|---|---|
| 3,792,005 | 2/1974 | Harlan | 524/505 |
| 4,101,482 | 2/1978 | Doss et al. | 524/505 |
| 4,178,337 | 12/1979 | Hall et al. | 524/505 |
| 4,361,675 | 11/1982 | Tan et al. | 524/505 |
| 4,386,187 | 5/1983 | Grancio et al. | 525/96 |
| 4,386,188 | 5/1983 | Grancio et al. | 525/96 |
| 4,429,076 | 1/1984 | Saito et al. | 525/301 |
| 4,480,005 | 10/1984 | Brownscombe | 524/505 |
| 4,483,958 | 11/1984 | Kosaka et al. | 524/505 |
| 4,716,183 | 12/1987 | Gamarra et al. | 524/505 |
| 4,977,014 | 12/1990 | Mitchell et al. | 524/505 |

FOREIGN PATENT DOCUMENTS

| | | | |
|---|---|---|---|
| 2352027 | 12/1977 | France . | |
| 2843987 | 10/1978 | Germany . | |
| 55-116741 | 9/1980 | Japan . | |
| 55-116743 | 9/1980 | Japan . | |
| 0063344 | 4/1982 | Japan | 524/505 |
| 62-11747 | 1/1987 | Japan . | |

*Primary Examiner*—Paul R. Michl
*Assistant Examiner*—Olga Asinovsky
*Attorney, Agent, or Firm*—Oliff & Berridge

[57] ABSTRACT

The present invention relates to a covering based on thermoplastic elastomers, especially a floor covering.

The matrix constituting such a covering is an alloy containing, as base, a styrene-based thermoplastic elastomer, as reinforcement, a styrene-based polymer and, as flexibilizer, an olefin polymer.

The coverings thus obtained satisfy the wear standards of a floor covering, can be calendered and exhibit good resistance to cigarette burns.

26 Claims, No Drawings

COVERINGS BASED ON THERMOPLSTIC ELASTOMERS, ESPECIALLY FLOOR COVERINGS

This is a Continuation of application Ser. No. 07/760,326 filed Sep. 16, 1991, now abandoned.

BACKGROUND OF THE INVENTION

The present invention relates to coverings of the floor-covering type, for domestic, commercial or industrial use, especially indoors, which are applied to various surfaces, chiefly floors. These coverings are intended to wear on their outer surface under the action of various agents including treading by people. These coverings, flat and relatively flexible, can in practice take a continuous form, as a strip, sheet, roll and the like, or a non-continuous form, as separate components, for example slabs. These coverings are generally adhesively bonded no the surface which they are intended to protect.

DESCRIPTION OF THE PRIOR ART

Hitherto, the commercially available large majority of these coverings has comprised a homogeneous matrix based on PVC (polyvinyl chloride). As is known, the use of PVC is increasingly threatened or criticized because of the chlorine released when it burns, for example when it is removed by incineration or burning in the open air. Consequently, even though PVC offers an excellent mechanical, acoustic and heat insulation compromise in its application to floor coverings, the manufacturers of these coverings have been looking for a substitute for it providing an answer to the following three points of concern:
- releasing no toxic gas when burnt, such as chlorine, hydrochloric acid, bromine, hydrobromic acid, sulfur dioxide or nitrogen oxides.
- having properties, especially mechanical properties, of the same order as those obtained today with PVC
- being capable of processing or fabrication on existing equipment, especially by extrusion, calendering, and the like.

Thus, according to document DE-A-3,306,776 a floor covering has been proposed, comprising, as matrix, a base polymer combining an EVA (copolymer of ethylene with vinyl acetate) and an EPR or EPDM (copolymer of ethylene with propylene), a filler and any appropriate additive, such as a plasticizer.

According to document EP-A-0,321,760, a floor covering of the same type as above has been proposed, comprising an EVA-based matrix, in a minor proportion by weight, and a filler, including the appropriate additives, predominant in the proportion by weight, it being then observed that the EVA additionally acts as a plasticizer, while the usual plasticizing agents, whose properties are generally detrimental to the final quality of the floor covering, can thus be eliminated.

It has been demonstrated that EVA-based coverings as described and proposed above, have insufficient mechanical properties at the surface, especially scratching resistance and abrasion resistance, while being difficult to convert or process on present equipment, especially by calendering.

In accordance with document FR-A-2,352,057, in order to obtain sealing sheets for building, which can be substituted for a coating of the bitumen or tar type, a flat and flexible plastic material has been proposed and described, comprising:
- from 33 to 95% by weight of a thermoplastic elastomer, for example an SBS
- from 5 to 33% by weight of a chlorosulfonated polyethylene
- various other ingredients such as plasticizer, slip agent, stabilizer, colorant
- an inorganic filling substance such as silicate or magnesia.

Such materials appear, as they are, ill-suited for obtaining floor coverings, particularly because they have an insufficient dimensional stability. In addition, their combustion releases toxic gases such as sulfur dioxide and chlorine, and this is contrary to the purpose of the present invention.

In accordance with document JP-A-62 11747, a flat and flexible plastic material has been described, consisting of a heat-weldable film comprising:
- from 10 to 80% by weight of a polystyrene or SBS
- from 5 to 50% by weight of an ethylene-methyl acrylate copolymer
- from 5 to 50% by weight of an SBS which has a styrene content of 10 to 50%.

Such an unfilled material, of the film type and consequently whose thickness is between 20 and 200 μm, has nothing to do with a material of the floor covering type, whose thickness is approximately between 6/10ths of a mm and 2 to 3 mm, with, for example, a weight per unit area of the order of 3 kg/m². The composition of such a material could not be extended to that of a floor covering, where, in particular, a reinforcing filler contributing to the dimensional stability of the final material must be added.

Similar remarks can be made concerning document DE-A-2,843,947, which also describes a heat-weldable film. In one of its embodiments, this document describes a plastic material comprising:
- less than 50% by weight of a thermoplastic elastomer, for example SBS containing from 10 to 50% by weight of styrene
- less than 70% by weight of a styrene-based elastomer, for example SBS containing from 50 to 95% by weight of styrene
- less than 90% by weight of a vinyl aromatic resin, for example polystyrene,
- from 2.5 to 50% by weight of an olefin polymer, for example an ethylene-alkyl acrylate copolymer.

In the case of documents JP-A-62 11747 and DE-A-2,843,987, the presence of an ethylene-alkyl acrylate copolymer appears indispensable for imparting an adhesiveness to the heat-weldable film.

In accordance with document JP-A-55 116,741, a plastic material of the self-extinguishing rigid type has been described comprising:
- from 68 to 90% by weight of polystyrene
- from 1.7 to 20% by weight of a thermoplastic elastomer, for example SBS
- from 5 to 33% by weight of an ethylene-vinyl acetate copolymer
- an inorganic substance resisting or retarding the action of flames, such as magnesia, dispersed in the polystyrene, in a proportion which can be up to 150 parts by weight per 100 parts by weight of the plastic substance.

This document describes nothing other than a polystyrene modified for various conversion purposes, such as molding; also, its teaching does not contribute anything to a person skilled in the art of floor coverings in order to satisfy his concern as identified above, namely of finding a plastic, flat and flexible material without toxic combustion, capable of being substituted for the present PVC-based coverings.

SUMMARY OF THE INVENTION

The subject of the present invention is therefore a flat and flexible plastic material capable of being substituted for PVC and exhibiting mechanical properties compatible with those generally required of a floor covering, and capable of being shaped with the equipment and techniques commonly employed in the field of floor coverings.

In this connection, it will be recalled that flat and flexible plastic materials for floor coverings of the PVC type:

have a thickness of between approximately 6/10ths of a mm and 2 to 3 mm, with, for example, a weight per unit area of the order of 3 kg/m$^2$ have a good dimensional stability contributed essentially by the inorganic reinforcing filler have a hardness of more than 80 Shore A exhibit an abrasion resistance lower than 500 mm$^3$ (Taber)

and have a breaking load of at least 50 daN/cm$^2$.

In the case of a matrix according to the present invention, the first choice was a styrene-based thermoplastic elastomer in the weight proportion of 20 to 90% of the matrix. It was then established that the styrene-based thermoplastic elastomer could not by itself be suitable for obtaining the required coverings, especially because of its scratchability, its abrasivity, its sensitivity to UV radiation, its static perforation and its mediocre calenderability.

Later, using an appropriate experimental procedure detailed below, it was determined that this base polymer could be favorably modified by the homogeneous and measured incorporation:

on the one hand, of a reinforcing polymer miscible in the base polymer, comprising at least one styrene-based polymer and intrinsically exhibiting good mechanical properties characterized by a flexural elasticity modulus (according to ASTM Standard D790) higher than 2,000 MPa, this being in a weight proportion of 5 to 50% by weight of the matrix and, on the other hand, of a flexibilizing polymer miscible with the base and reinforcing polymers, comprising at least one olefin polymer, the said flexibilizing polymer intrinsically exhibiting good flexibility characterized by a flexural elasticity modulus (according to ASTM Standard D790) lower than 100 MPa, this being in a weight proportion of 5 to 50% by weight of the matrix.

Finally, the plastic material according to the invention comprises up to 300 parts by weight, per 100 parts by weight of the alloy, of an inorganic filler for dimensional stability (for example chalk or talc).

Surprisingly and unexpectedly, and as shown by the experimental procedure introduced below, it has been found that the matrix defined above in general also exhibited an excellent resistance to burns, such as a cigarette burn. This characteristic appeared completely novel, since hitherto no other unvulcanized and recyclable thermoplastic material employed as a floor covering, such as plasticized PVC or modified EVA, appeared to have as good properties where cigarette burns are concerned.

It is, of course, difficult to explain the performance and results obtained according to the present invention. However, the following possible explanation may be put forward.

The styrene-based thermoplastic elastomer, for example an SBS (styrene-butadiene-styrene), as indicated below, consists of a succession of flexible (for example butadiene-based) and rigid (for example styrene-based) segments. The flexible segments, elastomeric in nature, normally impart elastic properties to the matrix, and the rigid segments assemble in regions whose cohesion is ensured by thermally labile intermolecular bonds. The flexible segments of the base polymer are undoubtedly plasticized by the flexibilizing polymer of the olefin polymer type, while the rigid segments of the same base polymer are hardened by the reinforcing polymer of the styrene-based polymer type. The latter also acts as a bridge between the various polymeric chains of the base polymer. Overall, the end result is therefore a matrix consisting uniformly of relatively rigid modules joined together by elastic bridging within the volume of the matrix. All this doubtless explains the original properties obtained according to the invention, both of the hardness and of the flexibility of the covering.

The specific properties of styrene-based thermoplastic elastomers of the SBS type have, of course, already been described in the literature and reference may be made in this connection to document EP-A-0,337,282, which describes, for example, the production of vapor-resistant sheets by mixing bitumen, a filling of usual additives and a thermoplastic agent made up of SBS and EVA. However, none of the documents examined previously has envisaged hitherto the use of a thermoplastic styrene-based elastomer of the SBS type as a base or matrix for a floor covering. With regard to the wear performance, the floor coverings obtained with the materials according to the present invention satisfy, in particular, the directives for approval of manufactured plastic floor coverings of the UEA tc and to the draft regulation of the CEN tc 134, whose content is incorporated in the present description as needed.

It is recalled that this wear performance relates especially to the hardness and the rigidity of the covering, its scratching resistance to chair castors, its secant modulus at 1 and 2%, its perforation resistance, its tear strength, its rupture strength, its abrasion resistance, its aging resistance and its resistance to ozone, to UV, to oils and to solvents.

With regard to the good conversion properties obtained with a material according to the present invention, these primarily concern calendering, particularly avoiding the sticking of the sheet of the covering obtained to the calender rolls.

Furthermore, and this is of importance, the coverings may be obtained with the materials according to the invention without incorporating any plasticizer whatsoever, for example an oil.

In addition, the present invention exhibits the following special features.

The alloy forming the matrix of the material according to the invention preferably contains:

from 30 to 70%, or from 30 to 90%, by weight of the base polymer from 15 to 35%, or from 5 to 45%, by weight of the reinforcing polymer from 10 to 40%, or from 5 to 45%, by weight of the flexibilizing polymer.

The base polymer contains at least one of the following substances, namely a block copolymer, with a branched or unbranched structure, of styrene and of a diene, especially an SBS (styrene-butadiene-styrene) or an SIS (styrene-isoprene-styrene), or else a block copolymer of styrene and of an alpha-olefin, especially an SEBS (styrene-ethylene-butylene-styrene).

The base polymer is preferably an SBS (styrene-butadiene-styrene) with a branched structure, whose styrene content is between 30 and 40% by weight of the said polymer and exhibiting an average molecular weight of the order of 400,000.

The styrene-based polymers described above, which are widely available commercially, are obtained by anionic catalysis in the presence of an organolithium initiator and of a coupling agent.

The styrene-based thermoplastic elastomers employed are in powder, chip or granule form, it being understood that oils-extended products must be ruled out. These elastomers are available commercially under the following references, especially:

"Cariflex TR" and "Kraton G" from SHELL
"Finaprene" from PETROFINA
"Europrene Sol T" from ENIMONT
"Calprene" from REPSOL.

The elastomers adopted according to the present invention will be selected in the light of the following considerations:

- branches increase the hardness and the strength of the covering but reduce its perforation strength
- the hardness of the covering increases with the proportion of styrene, but the resilience decreases correspondingly
- the flexural strength and wear resistance of the covering increases with the molecular weight of the elastomer.

The reinforcing polymer contains at least one of the following substances, namely a crystal polystyrene, an impact polystyrene, a poly-α-methylstyrene, an SAN (styrene-acrylonitrile) copolymer, or an ASA (acrylate-styrene-acrylonitrile). The reinforcing polymer is preferably a crystal polystyrene which has an average molecular weight of the order of 200,000 and a melt index of between 20 and 40 g/10 minutes (5 kg load at 200° C.), according to ISO standard R 1133.

The styrene-based reinforcing polymers which may be adopted according to the present invention are, for example:

"Gedex" from ATOCHEM
"Lacqrene" from ATOCHEM
"Pliolite" from GOODYEAR.

The flexibilizing polymer preferably contains an EVA (copolymer of ethylene and vinyl acetate). For example, the flexibilizing polymer is a copolymer of ethylene and vinyl acetate in which the comonomer (vinyl acetate) content is between 15 and 40% and preferably between 28 and 32% by weight of said flexibilizing polymer and which has a melt index of between 1 and 3 g/10 minutes, according to ISO Standard R 1133.

The flexibilizing polymers which may be employed according to the present invention are, for example:

"Riblene DJV" from ENIMONT
"Evatane" from ATOCHEM
"Escorene Ultra" from EXXON
"Lotryl" from ATOCHEM.

The dimensional stability filler is chosen, in so far as its nature, its particle size range and its hardness are concerned, as a function of the final properties desired in the covering, in particular its abrasion resistance and scratchability.

This filler is preferably a kaolin-silica mixture in a weight proportion of between 80:20 and 90:10:

the kaolin having a specific surface area (DIN 66131) of between 10 and 15 m²/g and a mean particle size of 5 to 7 μm the silica having a specific surface area of between 150 and 200 m²/g and a mean particle size of 18 to 20 nm.

However, this filler may also be an alumina hydrate-silica mixture in a weight proportion of between 80:20 and 90:10.

The fire behavior (reaction to fire, smoke opacity) of the materials according to the invention may be strengthened further by the incorporation of traditional flame proofing fillers (alumina hydrate, magnesium hydrate, magnesium carbonate, zinc borate) which are wholly or partially substituted for the kaolin in the above kaolin/silica mixture.

The covering may also comprise a conventional system for stabilization against degradation by oxygen, light, heat and ozone, combining from 10 to 25 parts by weight, per hundred parts by weight of the alloy, of titanium oxide, a UV screen and a phenolic antioxidant.

The stabilizing system with a screen may itself comprise:

| | |
|---|---|
| dithiocarbamate: | from 0 to 0.5 parts |
| phenolic antioxidant: | from 0.5 to 1 part |
| UV screen: | from 0.3 to 0.5 parts |

Such a stabilizing system makes it possible to avoid a drop in mechanical properties with time, hardening of the surface of the covering and the appearance of cracking and a network of microcracks.

The usual adjuvants may, of course, be incorporated in the coverings according to the present invention, namely lubricants and processing aids, waxes, resins improving the compactness of the material, coupling agents, antistatics, swelling agents and inorganic or organic pigments.

The present invention is now described and established by reference to the examples below.

In accordance with Table I below it is seen first of all that the decrease or even the absence of plasticizer (for example oil of a naphthenic or paraffinic nature) vitally improves the mechanical properties, (hardness, modulus and tensile strength), the surface properties, (abrasion, scratchability), the adhesive bonding, the color fastness, the resistance to cigarette burns and the fire behavior of the coverings obtained with materials according to the invention.

TABLE 1

| Composition of the covering | | | |
|---|---|---|---|
| SBS | 70 parts by weight | | matrix or alloy |
| PS | 30 parts by weight | | |
| Kaolin | 150 parts by weight | | per 100 parts by weight of the matrix or of the alloy |
| silica | 20 parts by weight | | |
| stabilizers, lubricants pigments | 20 parts by weight | | |
| Naphthenic oil | 30 | 15 | 0 |
| EVA (parts by weight per 100 parts by weight | 0 | 15 | 30 |

TABLE 1-continued of the matrix)
Properties of the covering

| | | | |
|---|---|---|---|
| Shore hardness (AST M 2240) | 68 ShC | 75 ShC | 82 ShC |
| Elongation at break | 60% | 45% | 30% |
| Breaking load NFT 46002 | 50 daN/cm² | 70 daN/cm² | 95 daN/cm² |
| Elastic product BS3261 | 3 MJ/m³ | 3.15 MJ/m³ | 2.85 MJ/m³ |
| Taber abrasion NFq Standard 03-055 | 300 mm³ | 150 mm³ | 85 mm³ |
| Sclerometer scratch | 250 g | 400 g | 650 g |
| UV discoloration ISO Standard 4892 | blue No. 4 | blue No. 5 | blue No. 6 |
| Adhesive bonding at 23° C. | 0.7 daN/cm | 0.8 daN/cm | 1.5 daN/cm |
| Adhesive bonding at 70° C. NFT Standard 76-126 | 0.8 daN/cm | 0.8 daN/cm | 1.3 daN/cm |
| Cigarette behavior | material | material | material |
| UEA tc D4 specification | undamaged brown mark | undamaged - light mark | undamaged - light mark |

In accordance with Table II below, a particularly favorable effect is observed in so far as the abrasion resistance, scratchability and the mechanical properties are concerned, which is obtained with an 88:12 kaolin/silica filler.

TABLE II

Composition of the covering

| | | |
|---|---|---|
| SBS | 60 parts by weight | matrix or alloy |
| PS | 20 parts by weight | |
| EVA | 20 parts by weight | |
| Stabilizers, lubricants and pigments | 20 parts by weight | per 100 parts by weight of the matrix or alloy |
| FILLERS | chalk 170 | talc 170 | kaolin 150 silica 20 |

Properties of the covering

| | | | |
|---|---|---|---|
| Shore hardness (ASTM 2240) | 74 ShC | 77 ShC | 86 ShC |
| Elongation at break | 30% | 25% | 20% |
| Breaking load NFT 46 002 | 50 daN/cm² | 80 daN/cm² | 120 daN/cm² |
| Elastic product BS 3261 | 1.5 MJ/m³ | 2.0 MJ/m³ | 6.0 MJ/m³ |
| Taber abrasion NF q 03-055 | 150 mm³ | 110 mm³ | 80 mm³ |
| Sclerometer scratch | 250 g | 350 g | 650 g |
| Cigarette behavior UEA tc D4 | material undamaged | material undamaged | material undamaged |

In accordance with Table III below, it is seen first of all that one of the SPS-PS-EVA compositions of a material according to the invention exhibits a suitability for calendering which is satisfactory in the case of lowest concentrations of EVA and excellent in the case of higher concentrations.

Conversely, it is seen that a PVC substitute composition according to the prior art and particularly rich in EVA cannot be calendered into the form of a uniform sheet. In addition, it does not satisfy the UEA tc D4 standard relating to the resistance to cigarette burns.

TABLE III

| NATURE OF THE MATERIALS | Compositions of the SBS - PS - EVA matrices of the invention | PVC-free composition of the prior art: |
|---|---|---|
| | | EVA 60 parts by weight |
| | | PP 35 " |
| | | E.P.D.M. 5 " |
| | | chalk 120 — parts per 100 parts by weight of the matrix |
| | | kaolin 50 |
| | | Stabilizers |
| | | Lubricants 20 |
| | | Pigments |
| SUITABILITY FOR CALENDERING | SBS: 30% to 70% PS: 15% to 45% EVA: 5% to 20% Calendering satisfactory SBS: 30% to 70% PS: 5% to 20% EVA: 20% to 45% Calendering excellent | Poor |
| CIGARETTE RESISTANCE UEA tc D4 | no damage to material light-colored mark | material attacked in bulk |

In accordance with Table IV below, it is seen that in the case of a material which has a constant SBS content, the relative concentrations of reinforcing polymer and of flexibilizing polymer are of fundamental importance for the objective of the invention.

When the matrix contains the reinforcing polymer but no flexibilizing polymer, a rigid and brittle sheet is obtained, which is also unsuitable for adhesive bonding.

Conversely, when the matrix contains the flexibilizing polymer but no hardening polymer, a flexible sheet is obtained which is devoid of the cohesion needed for use as a floor covering according to the test defined by the DIN standard 54324.

In addition, remarkable characteristics are observed in the case of a floor covering involving a highly filled thermoplastic material, in the case of reinforcing polymer/flexibilizing polymer weight ratios of 1 and 0.5 respectively.

Table IV illustrates the unexpected nature of the combination according to the invention of the reinforcing polymer and of the flexibilizing polymer, with neither substantially opposing the intrinsic properties of the other, while partly imparting its own properties to the matrix.

TABLE IV

COMPOSITION OF THE COVERING

| SBS | 70 parts by weight | |
|---|---|---|
| kaolin | 150 parts by weight | ⎫ per 100 parts by |
| silica | 20 parts by weight | ⎬ weight of the |
| Stabilizers, lubricants and pigments | 20 parts by weight | ⎭ alloy |

| | | | | | |
|---|---|---|---|---|---|
| PS) remainder to 100% of | 60 | 40 | 30 | 20 | 0 |
| EVA) the composition of the alloy | 0 | 20 | 30 | 40 | 60 |
| Properties of the covering | | | | | |
| Shore hardness (ASTM 2240) | 90 ShC | 89 ShC | 82 ShC | 78 ShC | 73 ShC |
| Elongation at break | 12% | 20% | 30% | 38% | 50% |
| Breaking load | 145 daN/cm² | 125 daN/cm² | 95 daN/cm² | 90 daN/cm² | 85 daN/cm² |
| Elastic product (NF T46 - 002) | 1.74 MJ/m³ | 2.5 MJ/m³ | 2.85 MJ/m³ | 3.42 MJ/m³ | 4.25 MJ/m³ |
| Taber abrasion (NF Q 03 - 0055) | 91 mm³ | 82 mm³ | 85 mm³ | 87 mm³ | 87 mm³ |
| Sclerometer scratch | 400 g | 650 g | 700 g | 800 g | 500 g |
| Chair with castors (DIN 54324) | no change in appearance | no change in appearance | no change in appearance | surface deformations | no cohesion and material gauged out |
| Adhesive bonding at 23° C. | unsuited for adhesive bonding | 0.8 daN/cm | 1.5 daN/cm | 1.8 daN/cm | 2.1 daN/cm |
| Adhesive bonding at 70° C. (NF T 76 - 126) | | 0.6 daN/cm | 1.3 daN/cm | 1.7 daN/cm | 1.9 daN/cm |
| Flexibility (UEAtc57) | rigid and brittle sheet | deformable sheet | flexible and deformable sheet | flexible and deformable sheet | flexible and deformable sheet |
| Cigarette behavior (UEAtcD4) | material undamaged | material undamaged | material undamaged | material undamaged | material undamaged |

With regard to their manufacture, the materials according to the present invention can be obtained by the conventional processes, non continuously or continuously.

In the non-continuous method, the various polymers and other additives can be mixed and kneaded with internal mixers usually employed in the rubber and plastics industries, and most particularly Farrel-Banbury mixers. The mixer is preheated to 80° C. before kneading and the various components of the mixture are then introduced. 10 to 15 minutes are needed to reach a temperature of 160°-180° C. in the mixer and to obtain a homogeneous product mass. The mixture is then discharged to be processed on a roll mill, the rolls having been preheated to 130°-150° C.

In the continuous method, continuously operating mixers are used (FCM mixers, Buss co-kneaders) which, under the same conditions as above, yield a hot strip which is converted into a sheet called a preform by passing on a roll mill at 130°-150° C.

A particularly advantageous result of the invention is that the homogeneous material obtained by mixing can be processed by calendering. In particular, by virtue of compositions according to the invention, the usual defects (bubbles, arrowheads, surface roughness, shrinkage) related to some characteristics of styrene-based elastomers (high viscosity when hot) are limited.

Various conventional processes make it possible to convert into sheets the preforms obtained after kneading and homogenizing:

- calendering: the preforms feed the calender; after calendering, the sheet is glazed and packaged in the form of rolls or slabs
- extrusion: the preforms are converted into sheets by extrusion, using a flat die
- roll milling/press forming: the preforms are granulated into chips; chips of various shapes and colors are mixed, heated to 150° C. in gelling machines and roll-milled-at 90°-100° C. cutup and press-formed non continuously
- continuous press forming: the preforms are granulated into chips; chips of various shapes and colors are mixed and deposited onto a textile support, forming a mat of 10 mm thickness; the mat is press-formed continuously on a press of the Auma type (manufactured by Berkstorff in Federal Germany); a randomly decorated sheet (4 mm thickness) is thus obtained and is then sectioned
- molding: granules such as described above can be mixed cold, combined with other decorative components if appropriate, distributed into molds and then pressed hot, for example in multiplaten presses.

Other examples are set out below, no limitation being implied, with the following compositions.

| | Examples | | |
|---|---|---|---|
| Ingredients | No. 1, 3, 5 and 6 | No. 2 | No. 4 |
| Base polymer | SBS "Cariflex TR" | SBS "Europrene Sol T" | SBS "Finaprene" |
| Reinforcing polymer | "Lacqrene" impact polystyrene | "Gedex" crystal polystyrene | "Gedex" crystal polystyrene |
| Flexiblizing polymer | "Riblene DJV" EVA | "Evatane" EVA | "Lotryl" EMA |
| Filler | kaolin, silica titanium oxide | kaolin, silica titanium oxide | alumina hydrate, zinc, borate, silica, magnesium carbonate, titanium oxide |

EXAMPLE 1

Into a Banbury-Farrel mixer of 60 l capacity, preheated to 70°-80° C., is introduced a first charge consisting of 18 kg of SBS (Cariflex TR), 7 kg of impact polystyrene (Lacqrene), 3 kg of EVA (Riblene DJV) and 30 kg of kaolin, followed by a second charge consisting of 10 kg of kaolin, 4 kg of silica, 3 kg of titanium oxide and various additives (stearin, UV screen, phenolic antioxidant, pigments). About ten minutes are needed for the mixture to reach a temperature of 170°–180° C., after which it cools to 160° C. on a roll mill (temperature of the rolls: 115° and 135° C.), on which it is homogenized. Preforms are pulled from the mill (thickness: 3 to 4 mm) and are then granulated, at the end of the line; the chips obtained are then screened. Chips of various colors are obtained, depending on the pigments employed; in particular, in the present example:

600 kg of pale gray granules
100 kg of black granules.

These granules are mixed at room temperature for about ten minutes and are then heated in gelling machines preheated to 145° C. (30–35 rev/minute).

The granules fall at 160° C. onto the rolling mill (rolls at 45° and 50° C.). A marbled sheet 2 mm in thickness is then obtained, which is conveyed towards the cutting system.

The slabs obtained are press-formed (hot cycle=20 minutes-170° C.-150 bar; cold cycle=20° C.-90 bar) and are then stabilized.

The physical and mechanical properties of the covering thus obtained are the following:

| density: | 1.57 g/cm$^3$ |
| --- | --- |
| hardness: | 80 Shore C (ASTM 2240) |
| sclerometer scratch: | 600 g |
| static penetration | |
| 15 seconds  = 2.0/100 mm | |
| 90 seconds  = 2.1/100 mm | initial indentation |
| 19 minutes  = 2.4/100 mm | (DIN standard 51 955) |
| 2 h 30  = 2.8/100 mm | |
| 15 seconds  = 1.9/100 mm | |
| 90 seconds  = 1.7/100 mm | |
| 19 minutes  = 1.3/100 mm | residual indentation |
| 2 h 30  = 1.2/100 mm | (DIN standard 51 955) |
| 24 h  = 0.9/100 mm | |
| chair on castors | > 25000 cycles (DIN standard 54324) |
| at break elongation | 20 to 25% (NFT standard 46002) |
| breaking load | 85 to 95 kg/cm$^2$ (NFT 46002) |
| 1% modulus | 38 kg/cm$^2$ (UEAtcM1 standard) |
| 2% modulus | 51 kg/cm$^2$ (UEAtcM1 standard) |
| abrasion | 85 mm$^3$ (NFq03-055 standard) |
| cigarette behavior | product undamaged (UEATcD4 standard) |

EXAMPLE 2

In this example a Buss co-kneader is employed (continuous operation), with a throughput of 1500 kg/h. The following are mixed in it at 155°–165° C.:

300 kg of SBS (Europrene Sol T)
100 kg of crystal polystyrene (Gedex)
100 kg of EVA (Evatane)
800 kg of kaolin
80 kg of silica
50 kg of titanium oxide
various additives (stearin, UV screen, phenolic antioxidant, pigment).

A hot strip is obtained, which feeds a roll mill (140°–142° C.) where the mixture is homogenized, and then a L-calender whose rolls have been preheated to 140°, 145°, 150° and 140° C. respectively.

Granules, of the same formulation but of another color can be introduced at the first stock in order to vein the calendered sheet.

After calendering, this sheet is glazed, cooled and stabilized.

The physical and mechanical properties of the covering thus obtained are the following:

| density | 1.56 g/cm$^3$ |
| --- | --- |
| hardness | 84 Shore C (ASTM 2240) |
| sclerometer scratch | 500 g |
| chair on castors | 25,000 cycles (DIN 54324) |
| break elongation | 25% (NF T 46-002) |
| breaking load | 90 to 100 kg/cm$^2$ (NF T 46-002) |
| 1% modulus | 40 to 45 kg/cm$^2$ (UEA tcM1) |
| 2% modulus | 59 to 60 kg/cm$^2$ (UEAtcM1) |
| abrasion | 80 mm$^3$ (Q 03-055 standard) |
| cigarette behavior | product undamaged (UEAtcD4 standard) |

EXAMPLE 3

The mixture of chips referred to in Example 1, that is:
600 kg of pale gray granules
100 kg of black granules is blended at room temperature for about ten minutes and then deposited onto a textile support to form thereon a mat about ten mm in thickness.

The mat is pressed continuously between the middle drum (170° C.) and the metal belt of an Auma machine and gives a nondirectional covering 4 mm in thickness.

The sheet obtained is sectioned through its thickness.

EXAMPLE 4

The following mixture, in parts by weight, is produced in a Banbury-Farrel kneader, (as described in Example 1):

| SBS Finaprene | 40 | |
| --- | --- | --- |
| Gedex Polystyrene | 25 | matrix or alloy |
| Lotryl EMA | 35 | |
| Aluminum hydroxide | 130 | |
| Silica | 50 | |
| Magnesium hydroxide | 10 | per 100 parts by |
| Zinc borate | 10 | weight of the matrix |
| Magnesium carbonate | 10 | or alloy |
| Titanium oxide | 10 | |
| Stearin, stabilizer and pigments | 10 | |

The mixture is homogenized on a roll mill and the preforms are granulated.

Chips of various colors are blended, reheated in gelling machines and roll-milled. The sheet obtained is cut up and the slabs are pressed and stabilized under the same conditions as in Example 1.

A covering obtained according to this example has, in particular, the following characteristics:

reaction to fire (NF 92501 epiradiator): class M2
smoke opacity and gas toxicity (NFX10-702 and NFX70-100): class F3

With such characteristics, this covering satisfies the requirements found in legislation concerning fire, relating to transport equipment, tall buildings and public premises. It conforms, in particular, to the SNCF, STM812A and RATP C22B standards.

EXAMPLE 5

150 kg of pale gray granules and 25 kg of black granules (as formulated in Example 1) are blended with 2 liters of plasticizing oil (of the Flexon or Enerpar type), to which a master batch consisting of:

300 g of carbon black
700 g of SBS powder (Cariflex TR) is added.

Once the blending has been carried out and each granule coated with a thin layer of black, the product is molded non-continuously (hot cycle=20 minutes-180° C., cold cycle=20 minutes-20° C., thickness=2 mm).

After stabilization, the slabs obtained are rubbed down.

The slabs obtained have a transverse electrical resistance of $3 \times 10^4$ ohms and can therefore be classified as conductive according to NF standard P 62-001.

Depending on the quantity of carbon black and the process conditions, it is also possible to obtain so-called "dissipating" slabs, with transverse resistances of the order of $10^6$ ohms.

EXAMPLE 6

In this example an extruder with an L/D ratio=25 and a compression ratio $\tau=3$, fitted with a flat die, is employed.

400 kg of pale gray granules (prepared as in Example 1) are blended with 200 kg of vulcanized granules formulated by starting with an SBR synthetic rubber.

The blend is extruded at 160° C. and, after extrusion, a 4 mm thick sheet is obtained which, once sectioned, exhibits a novel "embedded" decoration.

We claim:

1. A floor covering, which is an abrasion-, scratch-, and burn-resistant, dimensionally stable, flat and flexible plastic floor covering in the form of at least one strip, sheet or slab adhesively bonded to a floor, said floor covering comprising a dispersion comprising a homogeneous matrix in which an inorganic filler is dispersed, wherein said floor covering releases no toxic gas such as hydrochloric acid when it burns, said homogeneous matrix comprising:
   (A) from 20 to 90% by weight, based on a weight of said matrix, of a base polymer comprising at least a styrene-based thermoplastic elastomer,
   (B) from 5 to 50% by weight, based on a weight of said matrix, of a reinforcing polymer miscible with but different from the base polymer, comprising at least one styrene-based polymer, said reinforcing polymer exhibiting a flexural elasticity modulus higher than 2,000 MPa and a hardening effect on the matrix, and
   (C) from 5 to 50% by weight, based on a weight of said matrix, of a flexibilizing polymer miscible with but different from the base and reinforcing polymers, comprising at least one olefin polymer, said flexibilizing polymer exhibiting a flexural elasticity modulus lower than 100 MPa; and
   said inorganic filler being dispersed in said matrix in an amount from 50 to 300 parts by weight, per 100 parts by weight of the dispersion, for dimensional stability.

2. The floor covering as claimed in claim 1, wherein said matrix comprises from 30 to 90% by weight of the base polymer.

3. The floor covering as claimed in claim 1, wherein said matrix comprises from 5 to 45% by weight of the reinforcing polymer.

4. The floor covering as claimed in claim 1, wherein said matrix comprises from 5 to 45% by weight of the flexibilizing polymer.

5. The floor covering as claimed in claim 1, wherein said matrix contains from 30 to 70% by weight of the base polymer.

6. The floor covering as claimed in claim 1, wherein said matrix contains from 15 to 35% by weight of the reinforcing polymer.

7. The floor covering as claimed in claim 1, wherein said matrix contains from 10 to 40% by weight of the flexibilizing polymer.

8. The floor coverings as claimed in claim 1, wherein the base polymer contains at least one member selected from the group consisting of a block copolymer of styrene and of a diene, and a block copolymer of styrene and of an alpha-olefin.

9. The floor covering as claimed in claim 8, wherein the base polymer is an SBS (styrene-butadiene-styrene).

10. The floor covering as claimed in claim 9, wherein the SBS has a branched structure and a styrene content of between 30 and 40% by weight.

11. The floor covering as claimed in claim 1, wherein the reinforcing polymer contains at least one member selected from the group consisting of a crystal polystyrene, an impact polystyrene, a poly-$\alpha$-methylstyrene, an ABS (acrylonitrile-butadiene-styrene) terpolymer, an SAN (styrene-acrylonitrile) copolymer and an ASA (acrylate-styrene-acrylonitrile).

12. The floor covering as claimed in claim 11, wherein the reinforcing polymer is a crystal polystyrene whose melt index is between 20 and 40 g/10 mn.

13. The floor covering as claimed in claim 1, wherein the flexibilizing polymer contains an EVA (copolymer of ethylene and vinyl acetate).

14. The floor covering as claimed in claim 13, wherein the flexibilizing polymer is a copolymer of ethylene and vinyl acetate in which the vinyl acetate content is between 15 and 40% by weight of said copolymer and whose melt index is between 1 and 3 g/10 mn.

15. The floor covering as claimed in claim 1, wherein said floor covering is calendered.

16. A floor covering as claimed in claim 1 wherein the base polymer contains no processing oil.

17. The floor covering as claimed in claim 1, wherein said floor covering has a thickness of from 2 to 4 mm.

18. The floor covering as claimed in claim 1, wherein said inorganic filler is a kaolin-silica mixture in a weight proportion of between 80:20 and 90:10 or an aluminum hydroxide-silica mixture in a weight proportion of between 80:20 and 90:10.

19. A floor covering, which is an abrasion-, scratch-, and burn-resistant, dimensionally stable, flat and flexible plastic floor covering that comprises a dispersion comprising a homogeneous matrix in which an inorganic filler is dispersed, wherein said floor covering releases no toxic gas such as hydrochloric acid when it burns, said homogeneous matrix comprising:
   (A) from 20 to 90% by weight, based on a weight of said matrix, of a base block copolymer comprising at least a non-oil-extended styrene-based thermoplastic elastomer,
   (B) from 5 to 45% by weight, based on a weight of said matrix, of a reinforcing polymer miscible with but different from the base polymer, comprising at least one styrene-based polymer, said reinforcing polymer exhibiting a flexural elasticity modulus higher than 2,000 MPa and a hardening effect on the matrix, and
   (C) from 5 to 50% by weight, based on a weight of said matrix, of a flexibilizing polymer miscible with but different from the base and reinforcing polymers, comprising at least one olefin polymer, said flexibilizing polymer exhibiting a flexural elasticity modulus lower than 100 MPa; and said inorganic filler being dispersed in said matrix in an amount from 50 to 300 parts by weight, per 100 parts by weight of the dispersion, for dimensional stability.

20. The floor covering as claimed in claim 19, wherein said floor covering is in the form of at least one strip, sheet or slab adhesively bonded to a floor.

21. A method of covering a floor, comprising applying to said floor a floor covering as claimed in claim 19.

22. The floor covering as claimed in claim 19, wherein said floor covering is continuous in appearance, in the form of a strip or a sheet, or non-continuous, in the form of separate components of the slab type.

23. A plastic substance appearing in a discrete form, such as grains, granules, chips and other particles, wherein each particle is comprised of a dispersion identical with that defined in claim 19.

24. A floor covering, which is an abrasion-, scratch-, and burn-resistant, dimensionally stable, flat and flexible plastic floor covering that comprises a dispersion comprising a homogeneous matrix in which an inorganic filler is dispersed, wherein said floor covering releases no toxic gas such as hydrochloric acid when it burns, said homogeneous matrix comprising:

(A) from 20 to 90% by weight, based on a weight of said matrix, of a base block copolymer comprising at least a styrene-based thermoplastic elastomer, (B) from 5 to 45% by weight, based on a weight of said matrix, of a reinforcing polymer miscible with but different from the base polymer, comprising at least one styrene-based polymer, said reinforcing polymer exhibiting a flexural elasticity modulus higher than 2,000 MPa and a hardening effect on the matrix, and (C) from 5 to 50% by weight, based on a weight of said matrix, of a flexibilizing polymer miscible with but different from the base and reinforcing polymers, comprising at least one olefin polymer, said flexibilizing polymer exhibiting a flexural elasticity modulus lower than 100 MPa; and said inorganic filler being dispersed in said matrix in an amount from 50 to 300 parts by weight, per 100 parts by weight of the dispersion, for dimensional stability.

25. The floor covering as claimed in claim 19, wherein said floor covering has a thickness of 0.6 to 4 mm.

26. The floor covering as claimed in claim 24, wherein said floor covering has a thickness of 0.6 to 4 mm.

* * * * *